United States Patent [19]

Stummer

[11] Patent Number: 5,323,837
[45] Date of Patent: Jun. 28, 1994

[54] METHOD OF DETERMINING UNACCEPTABLE DEVIATIONS FROM PROCESS PARAMETERS

[75] Inventor: Friedrich Stummer, Fellbach, Fed. Rep. of Germany

[73] Assignee: Maschinenfabrik Mueller-Weingarten AG, Weingarten, Fed. Rep. of Germany

[21] Appl. No.: 942,195

[22] Filed: Sep. 9, 1992

[30] Foreign Application Priority Data

Sep. 26, 1991 [DE] Fed. Rep. of Germany ....... 4132002

[51] Int. Cl.$^5$ ............................................. B22D 17/20
[52] U.S. Cl. ..................................................... 164/4.1
[58] Field of Search .................. 164/4.1, 150, 151, 154

[56] References Cited

U.S. PATENT DOCUMENTS

| | | | |
|---|---|---|---|
| 4,094,055 | 6/1978 | Morimoto | 164/154 |
| 4,335,778 | 6/1982 | Motomura et al. | 164/150 |
| 4,469,164 | 9/1984 | Ishikawa et al. | 164/150 |
| 4,844,146 | 7/1989 | Kikuchi | 164/154 |
| 4,874,032 | 10/1989 | Hatamura | 164/154 |
| 4,884,621 | 12/1989 | Ban et al. | 164/4.1 |
| 4,954,063 | 9/1990 | Iwamoto | 164/151 |

FOREIGN PATENT DOCUMENTS 3111425 2/1982 Fed. Rep. of Germany.
3622822 1/1987 Fed. Rep. of Germany.

Primary Examiner—Paula A. Bradley
Assistant Examiner—Erik R. Puknys
Attorney, Agent, or Firm—Spencer, Frank & Schneider

[57] ABSTRACT

A computer implemented method of determining unacceptable deviations from process parameters associated with manufactured parts, for use with die-casting machines. The method includes entering in a data base empirically determined parameter values for the manufacture of good parts, constantly acquiring during a preproduction phase actual manufacturing parameter values as a set of parameters for each of a predetermined number of manufactured parts, testing the quality of the predetermined number of parts produced during the preproduction phase, classifying the acquired sets of parameters for each preproduction phase manufactured part as good or reject based on the testing, and storing the classified acquired sets of parameters for each preproduction phase manufactured part. Reject parts arising in a subsequent production phase are determined without quality inspection thereof by constantly acquiring during the production phase actual manufacturing parameter values as a set of parameters for each production phase manufactured part, and comparing acquired sets of parameters for each production phase manufactured part with the classified acquired sets of parameters for each preproduction phase manufactured part.

17 Claims, 2 Drawing Sheets

METHOD OF DETERMINING UNACCEPTABLE DEVIATIONS FROM PROCESS PARAMETERS

The invention relates to a method of determining unacceptable deviations from process parameters, particularly in die-casting or similar machines, according to the preamble of patent claim 1.

In a method described in DE 31 11 425 C2, in a learning phase several consecutive values of an operating magnitude can be stored during one work cycle of a machine tool, and limiting values can be derived from them, taking into account acceptable tolerances. It is then determined in a subsequent monitoring phase whether the actual operating magnitude values are above or below these limiting values. Either the maximum value, the minimum value or the average value of the values stored in the learning phase is used to form the limiting value for the monitoring phase. The aim of this known teaching is to stop a machine tool if, during its operation, an operating magnitude is above or below the limiting value established in this way.

The acquisition and storage of process parameters and the formation of reference values with zones of tolerance have also been known for a long time, in the regulation of die-casting machines in particular.

For example, DE 36 22 822 C2 describes a method of controlling of machine with appropriate control values, in which the operating conditions of the machine are detected, control parameters are stored and the control values are determined on the basis of the operating conditions detected, which control values are used to control the machine.

In practice, many attempts have been made before now to bring under regulated control the interdependencies of several parameters having set values affecting the quality of a final product during operation of a production plant. There is an extraordinarily large number of such parameters in die casting, such as melting temperature, meter amount, acceleration or speed during the various phases, the force to which the plunger rod is subjected, the position of the change-over point between individual phases, the receiver pressure at the start of the second phase, the position of the piston at the change-over point, molding temperatures, ejector force, amounts of lubricant per nozzle, spraying times, the composition of the molten mass etc. The relationship of these and similar magnitudes with one another and with the quality of the finished part is so complicated that an undesirably high proportion of reject parts are produced even in the most modern plants.

Unwanted production of such reject parts does not just give rise to additional costs; it also gives rise to time-consuming test procedures, which must be carried out after manufacture to reveal the defects of the reject parts.

It is therefore the object of the invention to provide a method which permits forecasting of the quality of the finished product on the basis of determination of unacceptable deviations from process parameters while production is taking place. This could considerably reduce the effort expended in quality inspection of cast parts.

This object is achieved by the distinguishing features of claim 1, on the basis of a method of the type described at the start of this description.

The concept on which the invention is based is the drawing of conclusions about the quality of a manufactured part from the values of process parameters, precisely determined during its production. To this end, the respective values of a set of parameters are in principle acquired, assigned and stored for each part produced. The quality of a predetermined number of parts is tested as normal in a kind of preproduction phase. As the parameter values for each part tested in this way are known, the various records, which consist of parameter values, can be divided up into "good" and "bad" records, depending on whether the corresponding parts are usable or not.

A statistical analysis of all records which occur more than once would also be conceivable, resulting in greater differentiation when parameter values are divided up. For example, it would be possible to determine, for a certain record which has occurred more than once, that a certain percentage of all parts produced under the corresponding configuration of values has a certain quality.

The division thus carried out of all records occuring from the preproduction phase can be used without further quality inspection to recognize rejects among the parts produced subsequently, i.e. in the actual production phase. If a statistical analysis as described in the previous section has been made, the usefulness of a record in the recognition of rejects can be evaluated accordingly.

In the subsequent production phase, all desired parameters are constantly stored and assigned to the individual produced parts. Comparison of the record for a certain part with the reference records from the preproduction phase, divided up as described above, in the simplest case into two classes, is used as a criterion to decide whether the part produced under the present configuration of values is usable, or whether it must be passed to the reject section.

To place some limits on the number of parts whose records are used for reference purposes, a certain interval can be placed round these reference values, so that every subsequent record which lies within this interval will be evaluated according to the reference record associated with this interval.

100 to 10,000 finished parts should expediently be used for reference purposes in the preproduction phase, with data acquisition, data analysis and utilization of this data analysis being able to be carried out by a sufficiently powerful computer.

The process parameter deviations determined can, of course, also be used in the regulation of parameters, which regulation can preferably be carried out with the same computer.

The sequence of the method according to the invention and an apparatus required therefor are illustrated in the diagram and described in greater detail below.

Figure 1:
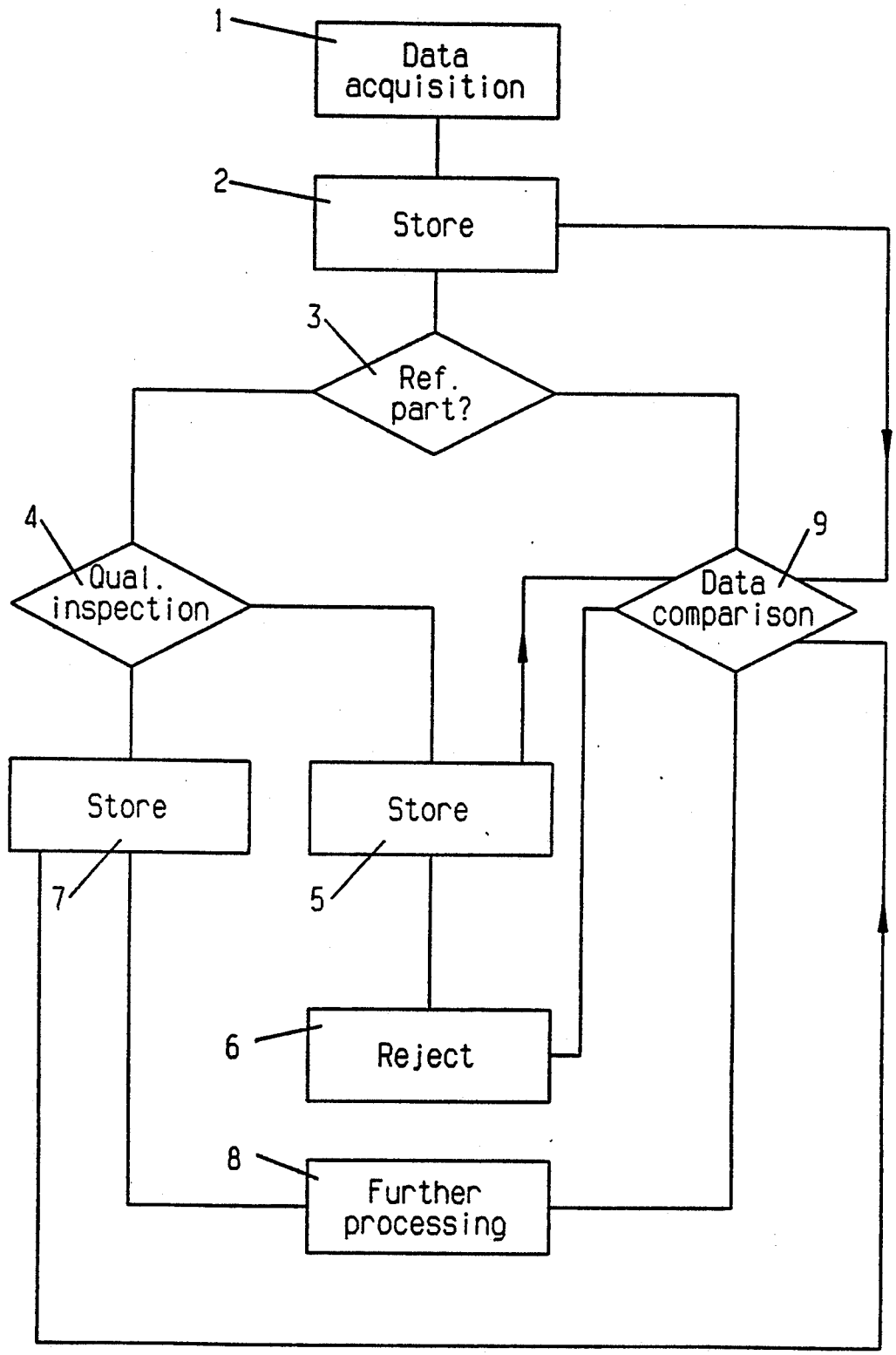
FIG. 1 is a flow chart representing one embodiment of the present invention.

The sequence shown in FIG. 1 is followed when a cast part is produced. In a first step 1, the parameter values during production of the cast part are initially acquired and stored in a second step 2 of the method. Then a distinction is made between two cases, which is why the flow chart branches at this point 3. If the finished part is to be used as a reference part for the recognition of rejects, it is subjected to a quality inspection 4. If this involves destructive testing, the result of the quality inspection is stored 5 and the destroyed part is, of course, removed 6. The same sequence is followed if testing is non-destructive if the cast part is of poor quality. If the cast part passes quality inspection, the result is also stored 7, and the good cast part is passed on for further processing 8.

If the method reaches branching point 3 with a cast part which is not to be used as a reference part, a decision is taken as to whether the cast part is to be assigned to the reject section 6 or passed for further processing 8, on the basis of a data comparison 9 with the data stored in step 2 of the method concerning the parts evaluated as good in step 4 of the method.

Recognition of rejects on the basis of the data comparison 9 is much less costly in terms of effort and money than the quality inspection 4.

Figure 2:
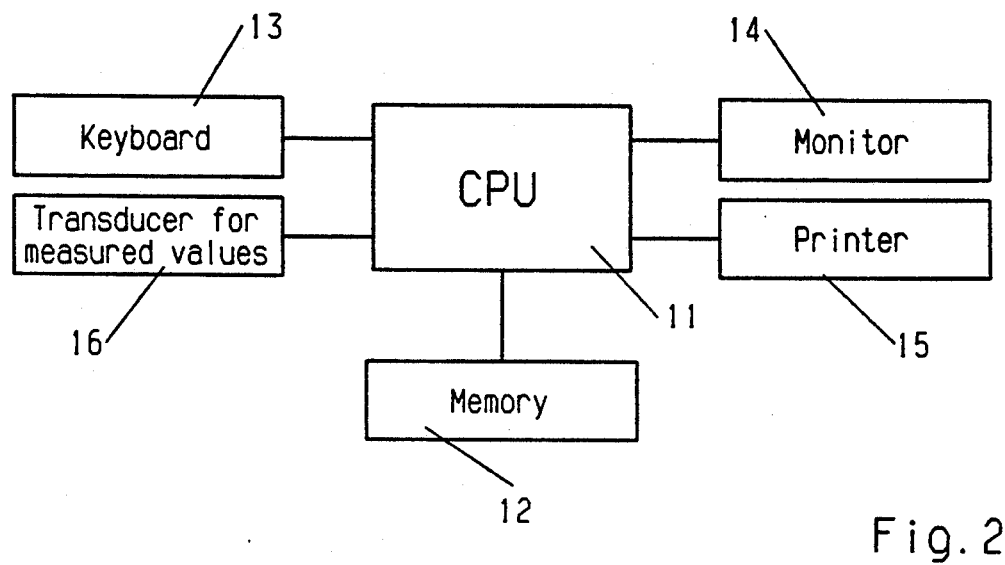
FIG. 2 is a block diagram diagrammatically illustrating an apparatus used to carry out the method and FIG. 3 is a diagram illustrating how the reference records are divided up.

FIG. 2 shows a block diagram of the apparatus with which the method described above can be carried out.

The key element of the equipment is a central processing unit 11 with a memory 12 and a number of peripherals 13, 14, 15. The latter are specifically a keyboard 13 as input unit, a monitor 14 and a printer 15 as output units. A number of transducers for measured values 16, only one of which is shown for reasons of space, are connected to one or more inputs of the central processing unit 11.

The central processing unit 11 is able to acquire the various parameter values via the transducers of measured values 16 during production, and store them in the memory 12. A program following the flow chart shown in FIG. 1 and described above is run on the central processing unit 11. The numbers of the parts suitable for further processing can be output on the monitor 14 or the printer 15 in the form of a list, for example.

Figure 3:
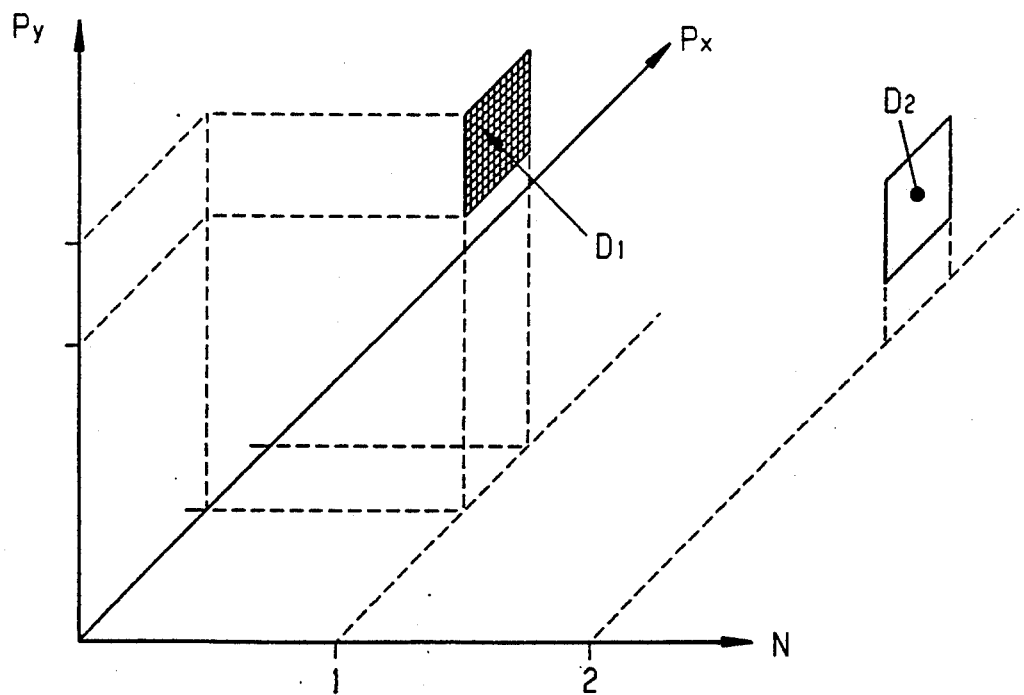

FIG. 3 shows a three-dimensional system of coordinates. Only two process parameters PX and PY and the serial numbers N of the parts used to determined reference data are represented on its axes, as the representation possibilities are limited. The records for individual parts are shown as points in a diagram such as this.

For example, point D1 in this diagram has two parameter values associated with it: one for PX (e.g. piston pressure) and one for PY (e.g. piston speed) as indicated on the coordinate axes. An interval for the parameter values is then placed round such a data point. This is represented in the illustration as a small area round data point D1. The records for other reference parts, for example the record shown as point D2 for the part with the serial number N=2, are treated similarly.

The records associated with all parts produced when determination of reference data has been completed, which records are derived from the parameter values existing during production, are tested to see whether they fall within one of these tolerance areas. If this is the case, the quality of the reference part associated with this tolerance area is ascertained. For example, if the record of a part falls within the shaded area belonging to point D1, the quality of the reference part with the serial number N=1 established in a conventional quality inspection is used to determine whether the part should be screened out or released for further processing.

The stored data can, of course, also be used to regulate the plant. For example, this can occur if the computer recognizes the increasingly frequent occurrence of "bad parts" with parameter records which cause them to be reject parts. This could lead to regulated intervention, i.e. the data relating to individual parameters could be altered.

Equipment to display and/or screen out parts of poor quality can also be provided.

I claim:

1. A computer implemented method of determining unacceptable deviations from process parameters associated with manufactured parts, for use with die-casting machines, comprising:

entering in a data base empirically determined parameter values for the manufacture of good parts;

constantly acquiring during a preproduction phase actual manufacturing parameter values as a set of individual parameters corresponding to each one of a plurality of manufactured parts;

testing the quality of the plurality of parts produced during the preproduction phase;

classifying each acquired set of individual parameters for each preproduction phase manufactured part as good or reject based on the testing of its corresponding part; and storing each classified acquired set of individual parameters for each preproduction phase manufactured part;

wherein reject parts arising in a subsequent production phase are determined without quality inspection thereof by:

constantly acquiring during the production phase actual manufacturing parameter values as a set of individual parameters for each production phase manufactured part; and comparing each acquired set of individual parameters for each production phase manufactured part with the classified acquired sets of individual parameters for each preproduction phase manufactured part assigning a pass classification to each manufactured part whose acquired set of individual parameters compares closely with a set of individual parameters acquired during the pre-production phase and classified as good based on the testing of its corresponding part.

2. The method as claimed in claim 1, wherein the testing of quality of the predetermined number of parts comprises performing one of a visual inspection and a non-destructive or destructive testing.

3. The method as claimed in claim 1, wherein there is a zone of tolerance associated with each of the acquired sets of individual parameters for each preproduction phase manufactured part classified as a good part, and wherein this zone of tolerance is used as a factor in the determining of a reject part.

4. The method as claimed in claim 1, wherein statistical methods are used to analyze the classified and stored acquired sets of individual parameters for each preproduction phase manufactured part prior to the subsequent production phase.

5. The method as claimed in claim 4, wherein identical sets of individual parameters for preproduction phase manufactured parts occurring more than once are used in the statistical analysis, and wherein a relative percentage of parts classified as good in sets of individual parameters for preproduction phase manufactured parts occurring more than once is determined.

6. The method as claimed in claim 4, wherein the frequency of occurrence of sets of individual parameters for preproduction phase manufactured parts occurring more than once is used as a measure of their usefulness as a criterion in determining reject parts.

7. The method as claimed in claim 1, wherein parameter deviations are determined and used to regulate set parameter values.

8. The method as claimed in claim 1, wherein a computer is used to acquire values and data, analyze these values and data, and utilize the analysis to regulate set parameters of a die-casting machine.

9. The method as claimed in claim 1, wherein the predetermined number of parts produced during the preproduction phase is from approximately 100 to 10,000.

10. The method as claimed in claim 1, wherein an apparatus is used in said testing step to screen out parts of poor quality.

11. A computer based quality control method for use in a computer controlled die cast manufacturing operation, wherein a computer including central processing means, input means, display means, sensors and transducers, and data storage means, controls and monitors manufacturing operations, the method comprising:
   (a) manufacturing a plurality of items under control of the computer in a pre-production run;
   (b) during pre-production manufacturing of each item:
   measuring with the computer a plurality of process parameters associated with manufacturing operations for each item; and
   storing in the data storage means of the computer measured process parameters for each item as a unique pre-production run data record to form a pre-production database so that each item manufactured in the pre-production run has a corresponding pre-production run data record of its individual measured process parameters;
   (c) testing a plurality of the items measured by the pre-production run;
   (d) categorizing the tested items as one of good or bad;
   (e) classifying each pre-production run data records in the pre-production database based on the testing and categorizing steps of its corresponding manufactured item, as one of good or bad accordingly;
   (f) manufacturing a plurality of items under control of the computer in an actual production run;
   (g) during actual production manufacturing of each item:
   measuring with the computer the plurality of process parameters associated with manufacturing operations for each item; and
   storing in the data storage means of the computer measured process parameters for each item as a unique actual production run data record;
   (h) comparing with the computer each of the individual measured process parameters of the stored actual production run data record for each item with the individual measured process parameters of the pre-production data records in the pre-production database;
   (i) assigning with the computer a pass classification to each item whose actual production run data record compares closely with a pre-production data record in the pre-production database whose corresponding manufactured item is classified as good; and
   (j) assigning with the computer a reject classification to each item whose actual production run data record compares closely with a pre-production data record in the pre-production database whose corresponding manufactured item is classified as bad.

12. The computer based quality control method according to claim 11, wherein the manufacturing process includes at least two phases and wherein the plurality of process parameters associated with manufacturing operations comprises any plurality of:
   melting temperature;
   meter amount;
   acceleration and speed during the phases;
   plunger rod force;
   the position of change-over points between phases;
   the receiver pressure at the start of a second phase;
   piston position at the start of a phase;
   molding temperature;
   ejector force;
   amount of lubricant per nozzle;
   spraying time; and
   molten mass composition.

13. The computer based quality control method according to claim 11, further comprising deleting pre-production data records in the pre-production database which are substantially identical before step (h), the step of comparing.

14. The computer based quality control method according to claim 11, wherein the plurality of items under control of the computer in a pre-production run is in the range of 100 to 10,000 items.

15. The computer based quality control method according to claim 11, wherein the testing comprises destructive testing.

16. The computer based quality control method according to claim 11, further comprising displaying on the display means of the computer a list of each item having a pass classification.

17. The computer based quality control method according to claim 11, further comprising:
   (k) assigning with the computer a screen classification to each item whose actual production run data record does not compare closely with a pre-production data record in the pre-production database classified as good or with a pre-production data record in the pre-production database classified as bad; and
   (l) testing each item classified as screen in step (k).

* * * * *